June 17, 1958 R. L. BERGESON 2,838,928
CENTER OF GRAVITY RESPONSIVE APPARATUS
Filed April 1, 1955 2 Sheets-Sheet 1
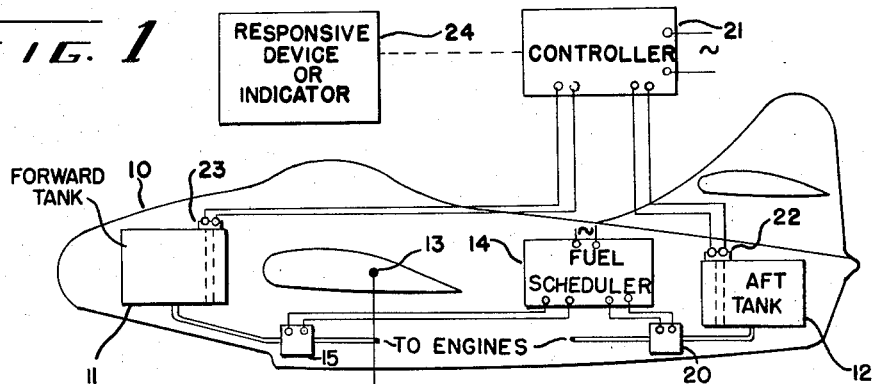
FIG. 1
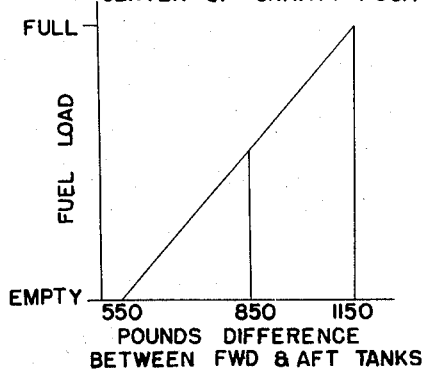
FIG. 2
FIG. 3
INVENTOR.
RAYMOND L. BERGESON
BY Joseph E Ryan
ATTORNEY

United States Patent Office 2,838,928
Patented June 17, 1958

2,838,928

CENTER OF GRAVITY RESPONSIVE APPARATUS

Raymond L. Bergeson, St. Paul, Minn., assignor to Minneapolis-Honeywell Regulator Company, Minneapolis, Minn., a corporation of Delaware Application April 1, 1955, Serial No. 498,730

6 Claims. (Cl. 73—65)

The present invention is concerned with apparatus for indicating the center of gravity, in particular the center of gravity of an aircraft which is subject to change as the fuel is consumed from various tanks on the craft.

In aerodynamic design, it is a well known principle that the center of gravity of the craft must be maintained within definite limits for the craft to remain airborne. The center of gravity of an aircraft is subject to change with loading. In the modern day large aircraft where a large quantity of fuel is carried in various fuel tanks located in all parts of the craft, the weight of the fuel and its consumption greatly affects the center of gravity of the craft. It is quite conventional to use a fuel scheduler which automatically schedules the fuel consumption from the various tanks as it is used by the engines of the craft so that the center of gravity as affected by the change in load as the fuel is consumed remains within predetermined limits for the best flying conditions.

The present invention is concerned in particular with apparatus for checking the fuel scheduler mentioned above. As the fuel is consumed from the various tanks on the craft and the center of gravity changes in accordance with a predetermined schedule, the present invention is responsive to this change in center of gravity position. Should the fuel scheduler become defective, apparatus can be placed in operation to override the fuel scheduler so that the consumption of fuel is maintained from the proper tank to maintain the center of gravity of the craft within predetermined limits.

It is therefore an object of the present invention to provide an improved center of gravity indicating system.

A further object of the present invention is to provide an improved system responsive to any deviation in unloading from a predetermined unloading schedule.

A still further object of the present invention is to provide a system responsive to any deviations in the actual center of gravity of a craft from a reference, as loading of the craft is changed.

Another object of the present invention is to provide a system responding to the change in center of gravity of an aircraft as fuel is consumed from a plurality of tanks thereon.

These and other objects of the present invention will become apparent upon a study of the specification and drawings of which:

Figure 1 is a schematic view of an aircraft showing the fuel tanks, a fuel scheduler, and a block diagram of the present invention;

Figure 2 is a graphical representation of the total fuel load as it affects the center of gravity position along the aircraft's longitudinal axis, for one particular fuel scheduler shown in Figure 1;

Figure 3 is a graphical representation of the desired fuel load versus pounds difference between two particular tanks on the aircraft, this being the case in one particular situation and is used for explanation purposes;

Figure 4:
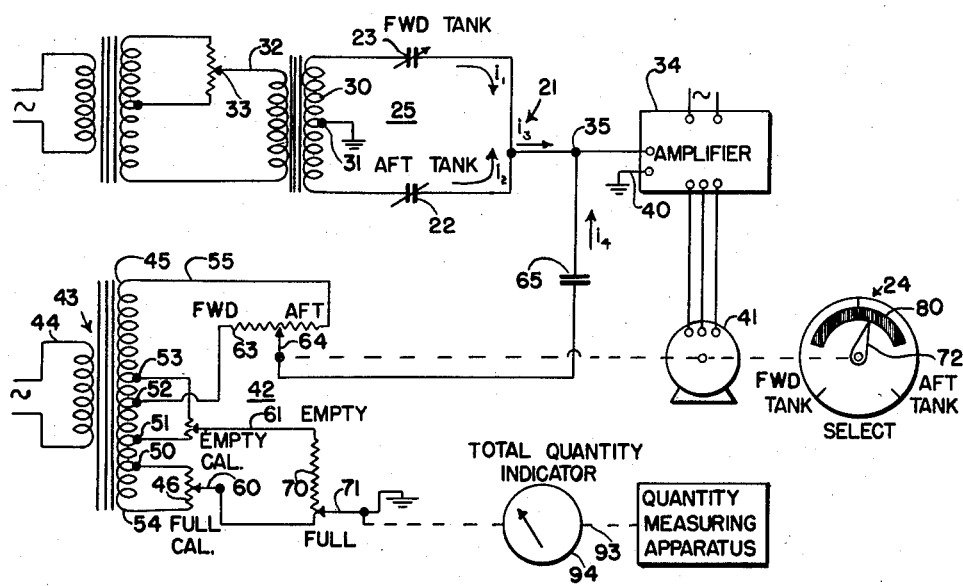
Figure 4 is a schematic circuit of the present invention as it is adapted to an indicating system for indicating whether the consumption of fuel from main and aft tanks on the aircraft is such that the center of gravity is within predetermined limits.

Referring to Figure 1, a schematic drawing of a typical aircraft 10 is shown having a plurality of fuel tanks, in particular a main fuel tank 11 and an aft fuel tank 12, located on opposite sides of an arbitrary reference point 13. As mentioned previously, in most large aircraft a conventional fuel scheduler 14 is used for scheduling the fuel consumption from the various tanks on the aircraft as it is used by the engine. The fuel scheduler controls the operation of a valve or pump 15 located in the fuel line from the forward tank to the engines and a valve or pump 20 located in the fuel line from the aft tank to the engines. The fuel scheduler is preset so that fuel consumption from the various tanks on the craft is provided to maintain the center of gravity of the craft with respect to reference point 13 along a predetermined schedule as the total fuel load is reduced during flight. A typical schedule is shown in Figure 2; however, it should be recognized that such a schedule could vary for different aircraft depending on what is required. The total fuel load in pounds is plotted with respect to the center of gravity position along the aircraft longitudinal axis as the fuel is used. The fuel scheduler 14, in this particular example, upon initially starting the engine with full tanks, schedules fuel use from the aft tank first so that the center of gravity moves forward or to the left along the actual overall center of gravity plot and then at some specific value, the center of gravity is maintained constant by scheduling the consumption of fuel from the main and aft tanks. As the weight of fuel is reduced and the quantity approaches zero, more fuel is taken from the forward tank so that the center of gravity moves to the rear of the craft and is shown eventually to move out of the allowable deviation range.

The present invention is concerned with a controller 21 having quantity responsive devices 22 and 23 in the aft and forward tanks whose output is connected to the controller. Devices 22 and 23 are a conventional capacitance type tank unit of a sort shown in the Griffith Patent 2,563,281. The tank unit has a capacitance which varies with the quantity or weight of fuel in the tank. The output of the controller 21 is connected to a responsive device or indicator 24.

Referring to Figure 4, the specific details of controller 21 are shown. It has a bridge network circuit 25 to which tank units 22 and 23 are connected in adjacent legs. The secondary 30 of the transformer has a center tap 31 grounded. The sections of the secondary on each side of the center tap 31 form the other two adjacent legs of bridge 25. The primary winding 32 of the transformer is connected to a source of power and the voltage to the primary winding is adjustable by a movable wiper 33 of a potentiometer connected to the power source. Bridge circuit 25 has an output equal to the summation of $i_1$ and $i_2$ which are of opposite phase and depend upon the capacitance of units 22 and 23, this output being shown as $i_3$. As the output current from each branch is proportional to the capacitance of the tank unit, it is indicative of the weight or quantity of fuel in the tank. Therefore $i_3$ is proportional to the quantity difference between tanks 11 and 12.

The output of the bridge circuit is connected to the input of an amplifier 34 by a conductor 35. A second input terminal of the amplifier 40 is grounded. The output of the amplifier controls the operation of a motor 41. The amplifier and motor combination being of a sort similar to the amplifier and motor of the Albert Upton Patent 2,423,534 in which the reversible motor is controlled by the phase and magnitude of the input signal to the amplifier. When the input to the amplifier is of one phase the motor operates in one direction and upon a reversal of phase the motor will reverse.

Referring to a scheduling and rebalance network circuit 42, a transformer 43 has a primary winding 44 connected to a source of power and a secondary winding 45. The secondary winding has a plurality of taps 50, 51, 52 and 53 arranged in the order named between end terminals 54 and 45, respectively. Connected between end terminal 54 and tap 50 is a full calibration resistor 46 having a movable wiper 60 thereon. Connected between taps 51 and 53 is a second resistor for empty calibration having a movable wiper 61 thereon. Connected between tap 52 and end terminal 55 is a rebalance resistor 63 having a movable wiper 64 thereon positioned by the output of motor 41. Movable wiper 64 is connected through a reference capacitor 65 to the input terminal of amplifier 34. A scheduling resistor 70 is connected between movable wipers 60 and 61, it having a movable wiper 71 which is grounded. The output of network circuit 42, indicated by current $i_4$, combined with $i_3$ controls amplifier 34 to position motor 41. Movable wiper 71 is controlled in response to the total quantity of fuel in all of the tanks. It is connected by a mechanical connection 93 connected between a motor and an indicator 94 of apparatus measuring the total quantity of fuel in tanks 11 and 12, of a sort shown in the John W. Bancroft application Serial No. 181,747, filed August 28, 1950, now Patent No. 2,793,529. Specifically referring to Figure 1 of the drawing of that application, indicator 94 is connected to a motor by connection 93.

Referring to Figure 3, a fuel load versus pounds difference characteristic between the forward and aft tank is shown. Such a fuel scheduling curve depends upon the design of the aircraft fuel system, and in the particular example used, the tanks are so located on the craft and their configuration or size is such that, as the fuel is drained or consumed from the tanks to maintain the center of gravity at reference 13 shown in Figure 2, the pounds difference between the forward and aft tank must be in accordance with the schedule shown in Figure 3. Thus, at full tanks, one tank contains 1150 pounds more fuel than the other. When the other tank is empty, the first mentioned tank has 550 pounds of fuel. It is obvious that any sort of schedule could be used depending upon the design of the aircraft fuel system to maintain the center of gravity at the reference point.

In Figure 4 resistor 70 is characterized in accordance with the fuel schedule curve shown in Figure 3 and since the fuel schedule is linear, resistor 70 is linear; however, should any other schedule be desired resistor 70 or its wiper movement would be characterized for that schedule. The output of network 42 with the rebalance potentiometer wiper 64 at the center or zero position is such that current $i_4$ balances out the current $i_3$ from network 25 if the fuel in the respective tanks is drained or consumed in accordance with the fuel schedule of Figure 3. With the currents $i_3$ and $i_4$ canceling each other, motor 41 remains inoperative and an indicator pointer 72 connected thereto remains on zero indicating that the center of gravity of the aircraft was at the reference center of gravity 13.

The consumption of fuel from the forward and aft tanks deviates from the schedule necessary, as indicated by Figure 3, to maintain the center of gravity at reference center of gravity 13 when controlled by apparatus such as the fuel scheduler 14 previously mentioned. The fuel scheduler drains the forward and aft tanks so that the actual center of gravity deviates from the reference center of gravity as shown in Figure 2. The output of fuel schedule and rebalance network 42, that is $i_4$, is then not sufficient to balance the current $i_3$ as the pounds difference between the forward and aft tank is different than the schedule previously mentioned in Figure 3. This would cause operation of the motor 41 to readjust rebalance potentiometer wiper 64 to modify the voltage so that the current $i_4$ balances $i_3$. At balance, the position of pointer 72 indicates on which side of the zero or reference center of gravity 13 the actual over-all center of gravity is. In following the schedule of actual over-all center of gravity shown in Figure 2, the pointer is initially to the right indicating that a selection of fuel from the aft tank is necessary to bring the center of gravity of the craft back to the reference center of gravity.

As long as the pointer remains within the shaded area 80 on the dial, the pilot knows that the center of gravity is still in the allowable deviation range. Should something go wrong with the fuel scheduler 14 and the schedule of actual center of gravity, as shown in Figure 2, is not followed, it is indicated by a movement of pointer 72 beyond the shaded portion 80 and the pilot is then required to manually override the fuel scheduler to prevent the center of gravity of the craft from leaving the allowable range.

Operation of Figure 4

To calibrate the system shown in Figure 4, scheduling potentiometer wiper 71 is manually moved to the upper end of resistor 70 and reference capacitances are inserted in place of the tank units 22 and 23 so that the capacitances are equal and thus the currents $i_1$ and $i_2$ are equal. As the empty calibration resistor spans over the tap 52 connecting rebalance resistor 63 to the source of power, it is possible to move the empty calibration wiper 61 upward so that the rebalance wiper moves off one end of the resistor 63 to balance the system. Upon changing the capacitance in one of the tank units a predetermined amount, a certain deviation in the position of pointer 72 is obtained as the rebalance potentiometer is repositioned by motor 41. The voltage to bridge circuit 25 is adjusted by movable wiper 33 to obtain a desired movement of pointer 72 for that particular change in quantity of fuel difference between the simulated tank capacitance in the bridge circuit 25. With indicator 24 calibrated the position of wiper 33 is not changed. The simulated tank units or capacitors placed in the bridge circuit in place of units 22 and 23 are adjusted to simulate the required 550 pounds difference between the main and aft tanks as shown in Figure 3 and the empty calibration potentiometer wiper 61 is adjusted to zero pointer 72. Wiper 71 is then manually moved to the lower end of resistor 70 and the capacitance of the simulated tank unit is changed to simulate the 1150 pounds difference. The full calibration wiper 60 is then adjusted to zero pointer 72.

As shown in Figure 4, the tank units are filled and the wiper 71 of the scheduling potentiometer is at the lower end or its full position. The current output $i_3$ of bridge network 25 is balanced by current $i_4$ and the system is in balance so that the pointer 72 is to the right of zero indicating that the center of gravity is slightly behind the reference center of gravity 13 shown in Figure 1. Let us now assume that the fuel is to be consumed from the tanks in accordance with a schedule shown in Figure 2 labeled "actual over-all center of gravity as maintained by the fuel scheduler." First more fuel is drained from the aft tank to maintain the pounds difference schedule as shown in Figure 3. The current output $i_3$ is not balanced by the current $i_4$ produced solely by a change in voltage from schedule and rebalance network 42 as wiper 71 moved upward on the scheduling resistor 70. Motor 41 then operates to reposition rebalance wiper 64 changing the voltage output of circuit 42 so that currents $i_3$ and $i_4$ balance each other bringing the motor to a stop. As the fuel is consumed from the tanks, in accordance with the actual schedule shown in Figure 2, pointer 72 would move over to the left but at all times it would remain in the range of the shaded portion 80. The pilot then knows that the actual center of gravity of the craft is within the allowable deviation range and safe flight is possible.

Assume that fuel scheduler 14 became inoperative and fuel was only consumed from the aft tank. The actual center of gravity would move to the left of the plot shown in Figure 2 out of the allowable deviation range. To balance the current $i_3$ from network circuit 25, the output of network 42 is modified by a repositioning of the rebalance wiper 64 so that current $i_4$ continuously balances $i_3$. Such a repositioning of wiper 64 by motor 41 also moves pointer 72 further to the left out of the range of the shaded portion 80 on the dial and the pilot would then be given an indication that fuel should be selected from the main tank by some manual override means. Of course a similar result would be obtained if the fuel scheduler only allowed fuel to be consumed from the main tank so that the actual center of gravity of the craft moved to the right of the reference center of gravity. Pointer 72 is then moved clockwise and a visual indication is given to select fuel from the aft tank.

While an indicator dial is shown in Figure 4, it is obvious that a responsive device of some sort responsive to a deviation of the actual center of gravity from the reference center of gravity could be used. It is therefore intended that the scope of the invention be only limited by the appended claims.

I claim:

1. In a control system, first responsive means responsive to the quantity of fluid in a first tank and having an output signal indicative thereof, second responsive means responsive to the quantity of fluid in a second tank and having an output signal indicative thereof, means combining said signals to provide a signal indicative of the actual quantity difference in the first and second tanks, means responsive to the total quantity of fluid in the first and second tanks, circuit means having a variable voltage source adjusted by said last mentioned means and providing a signal indicative of the desired quantity difference in the first and second tank units as total quantity changes, amplifier means, means applying said signals to said amplifier motor means, said amplifier means controlling said motor means in accordance with the resultant of said signals indicative of actual quantity difference and desired quantity difference, rebalance means connected in said circuit means and adjusted by said motor means for modifying said desired quantity difference signal to balance said signal indicative of actual quantity difference to establish a null condition, and means responsive to the amount of rebalance and thus the deviation between actual quantity difference and desired quantity difference.

2. In a control apparatus for a craft whose center of gravity changes as various loads spaced about the craft change, first means responsive to the craft load on one side of an arbitrary reference point and having an output signal indicative of said load, second means responsive to the craft load on the other side of the reference point and having an output signal indicative of said load, means combining said outputs to provide a resultant signal indicative of the actual difference in load of said one side or said other side, means responsive to the sum of the various loads of the craft, means operable by said last mentioned means for providing another signal indicative of the desired difference in load for said one side and said other side, motor means, connection means connecting said resultant signal and said other signal to said motor means so that the difference of the two signals renders said motor means operative, and a signal source whose output is adjusted by said motor means, said signal source being connected to said motor means to balance any difference between said resultant signal and said other signal.

3. In control apparatus for checking the delivery of a medium from a plurality of spaces, first means responsive to the quantity of medium in a first space, said means having an output indicative of the quantity remaining in the space, second means responsive to the quantity of medium in a second space, said means having an output indicative of the quantity remaining in the space, means for combining said outputs to produce a resultant signal indicative of the difference in quantity of the first and second spaces, means responsive to the total quantity of both spaces, means adjusted by said last mentioned means having an output for balancing said resultant signal if the difference in quantity of the first and second spaces follows a predetermined schedule as the total quantity changes, and means responsive to the difference between said resultant signal and said scheduling means output.

4. In an indicating system for use on an aircraft having a plurality of fuel tanks located in various positions on the craft, capacitance type responsive means associated with at least two of the mentioned tanks having a capacitance indicative of the quantity of fuel in its particular tank, an A. C. bridge circuit having a first of said capacitance responsive means in one leg and a second of said capacitance responsive means in an adjacent leg, the output of said bridge circuit being indicative of the fuel quantity difference between the two tanks, amplifier means having an input and an output, motor means, means connecting the output of said bridge circuit to the input of said amplifier means and means connecting the output of said amplifier to said motor means to allow positioning of said motor means, balance means having a first variable source of A. C. voltage providing a first signal determined by the position of said motor means, and a second variable source of A. C. voltage providing a second signal indicative of a selected quantity difference desired in the fuel quantity of the two mentioned tanks as the total quantity in all tanks changes, said first signal being combined with said second signal to provide a balance output, said balance output being connected to the input of said amplifier means for balancing the output of said A. C. bridge circuit, and indicator means connected to said motor means for indicating any deviation of the actual quantity difference between the two tanks and the selected quantity difference.

5. In a center of gravity indicating system for indicating the deviation of fuel use from a plurality of tanks from a predetermined use schedule, the combination comprising: electrical circuit means, said circuit means including a first responsive means for a first tank having an output of one phase and a magnitude indicative of the quantity of fuel therein and a second responsive means for a second tank having an output of an opposite phase and a magnitude indicative of the quantity of fuel therein; amplifier means having an input and an output; motor means; means connecting said circuit means to the input of said amplifier means and means connecting the output of said amplifier to said motor means to allow positioning of said motor means; balance means including a first circuit providing a signal of magnitude depending upon the position of a movable member driven by said motor means and a second circuit means providing a signal of magnitude adjusted in accordance with a desired schedule of fuel use from the first and second tanks by a device having an output indicative of total fuel quantity in the plurality of tanks, said balance means being connected to the input of said amplifier so that the signals of said first and second circuits balances the outputs of said electrical circuit means; and indicator means driven by said motor means indicating any deviation between the actual fuel use and the desired schedule of fuel use.

6. In an indicating system for indicating any deviation between an actual difference in the quantity of medium in a first and second container and a scheduled difference, first means responsive to the quantity of medium in the first container and having an output signal indicative thereof, second means responsive to the quantity of medium in the second container and having an output signal indicative thereof, means combining said output signals to provide a signal indicative of the actual difference in quantity of medium in the first and second containers, means responsive to the total quantity of medium in the first and second containers, motor means, balance means including third means driven by said motor means and providing a signal of magnitude determined thereby and fourth means adjusted by said means responsive to the total quantity of medium and providing a signal indicative of the desired difference in quantity of medium of the first and second containers, means connecting the signals of said third and fourth means and the output signals of the first and second means in controlling relation to said motor means, and means driven by said motor means for indicating any deviation between the output signals of said first and second means and the signal of said fourth means.

References Cited in the file of this patent

UNITED STATES PATENTS

| | | |
|---|---|---|
| 2,541,429 | Mathes | Feb. 13, 1951 |
| 2,615,330 | Blackmon | Oct. 28, 1952 |
| 2,656,977 | Cummings | Oct. 27, 1953 |
| 2,672,880 | Hermanson | Mar. 23, 1954 |
| 2,751,921 | Baldwin | June 26, 1956 |